United States Patent
Carter, Sr.

[11] Patent Number: 5,178,518
[45] Date of Patent: Jan. 12, 1993

[54] FREE-YAW, FREE-PITCH WIND-DRIVEN ELECTRIC GENERATOR APPARATUS

[76] Inventor: J. Warne Carter, Sr., 4302 Arnold Dr., Wichita Falls, Tex. 76302

[21] Appl. No.: 522,452

[22] Filed: May 14, 1990

[51] Int. Cl.$^5$ .............................................. F03B 7/00
[52] U.S. Cl. ................................ 416/11; 416/132 B; 416/140
[58] Field of Search ........................... 416/9–11, 416/14, 32, 169 B, 147, 148

[56] References Cited

U.S. PATENT DOCUMENTS

| | | | |
|---|---|---|---|
| 756,616 | 4/1904 | Fornander | 416/9 |
| 774,168 | 11/1904 | Fornander | 290/49 |
| 1,397,713 | 11/1921 | Anderson | 416/169 B |
| 1,726,599 | 9/1929 | Wasson | 188/180 |
| 2,360,791 | 10/1944 | Putnam | 416/37 |
| 2,360,792 | 10/1944 | Putnam | 290/4 |
| 2,363,827 | 11/1944 | Albers | 416/9 X |
| 2,484,291 | 10/1949 | Hays | 417/336 |
| 2,784,556 | 3/1957 | Perdue | 416/9 X |
| 4,281,965 | 8/1981 | Stjemholm | 416/169 B |
| 4,297,075 | 10/1981 | Jacobs et al. | 416/140 R |
| 4,335,996 | 6/1982 | Ross | 416/9 X |
| 4,366,387 | 12/1982 | Carter, Jr. et al. | 290/55 |
| 4,378,198 | 3/1983 | Pettersson | 416/140 R |
| 4,406,094 | 9/1983 | Hempel et al. | 416/11 X |
| 4,431,375 | 2/1984 | Carter, Jr. et al. | 416/132 |
| 4,435,646 | 3/1984 | Coleman et al. | 416/11 X |
| 4,469,956 | 9/1984 | D'Amato | 416/132 B X |
| 4,515,525 | 5/1985 | Doman | 416/11 |
| 4,545,728 | 10/1985 | Cheney, Jr. | 416/11 |
| 4,547,124 | 10/1985 | Kliatzkin et al. | 416/11 X |
| 4,557,666 | 12/1985 | Baskin et al. | 416/32 |
| 4,571,155 | 2/1986 | Angeloff | 416/13 |
| 4,664,596 | 5/1987 | Wood | 416/169 B |
| 4,692,094 | 9/1987 | Kulinyak | 416/11 |
| 4,815,936 | 3/1989 | Stoltze et al. | 416/9 |
| 4,909,703 | 3/1990 | Jacobs | 416/140 R |
| 4,966,525 | 10/1990 | Nielsen | 416/9 |

FOREIGN PATENT DOCUMENTS

| | | | |
|---|---|---|---|
| 1006276 | 4/1957 | Fed. Rep. of Germany | 416/140 |
| 1118110 | 11/1961 | Fed. Rep. of Germany | 416/11 |
| 2913407 | 10/1980 | Fed. Rep. of Germany | 416/11 |
| 2916878 | 11/1980 | Fed. Rep. of Germany | 416/11 |
| 3008379 | 9/1981 | Fed. Rep. of Germany | 416/9 |
| 3515789 | 11/1986 | Fed. Rep. of Germany | 416/14 |
| 23258 | 10/1969 | Japan | 416/9 |
| 8503391 | 7/1987 | Netherlands | 416/170 A |
| 40533 | 12/1957 | Poland | 416/11 |
| 1285186 | 1/1987 | U.S.S.R. | 416/1 D |

*Primary Examiner*—John T. Kwon
*Attorney, Agent, or Firm*—Shapiro and Shapiro

[57] ABSTRACT

Wind-driven electric generator apparatus has a generator head supported on a tower for free-yaw movement and for free-pitch movement within predetermined limits. The generator head has a downwind rotor with a pair of elongated blades mounted on a hub that is rigidly attached to a rotor shaft driving an electric generator. The blades are flexible and have a coning angle therebetween that varies with wind velocity. The generator head is capable of aligning itself with the wind direction azimuthally and elevationally. A yaw brake prevents an excessive yaw rate. In most preferred embodiment, pitch movement and yaw movement beyond small angular ranges are regulated, and an electrohydraulic yaw drive system corrects gross azimuthal misalignment with respect to the wind direction.

44 Claims, 14 Drawing Sheets

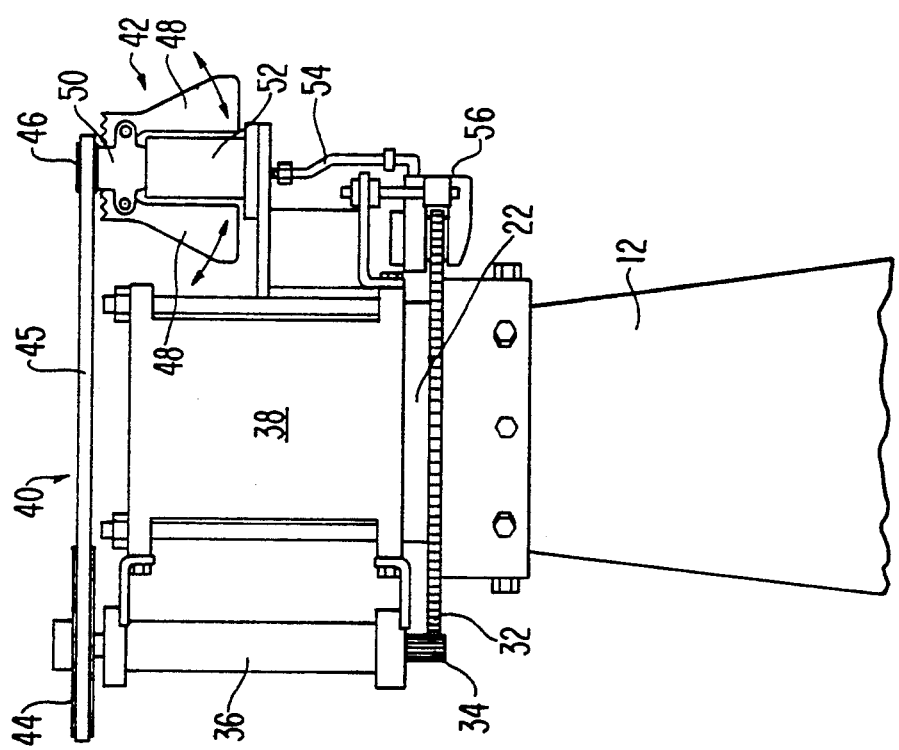
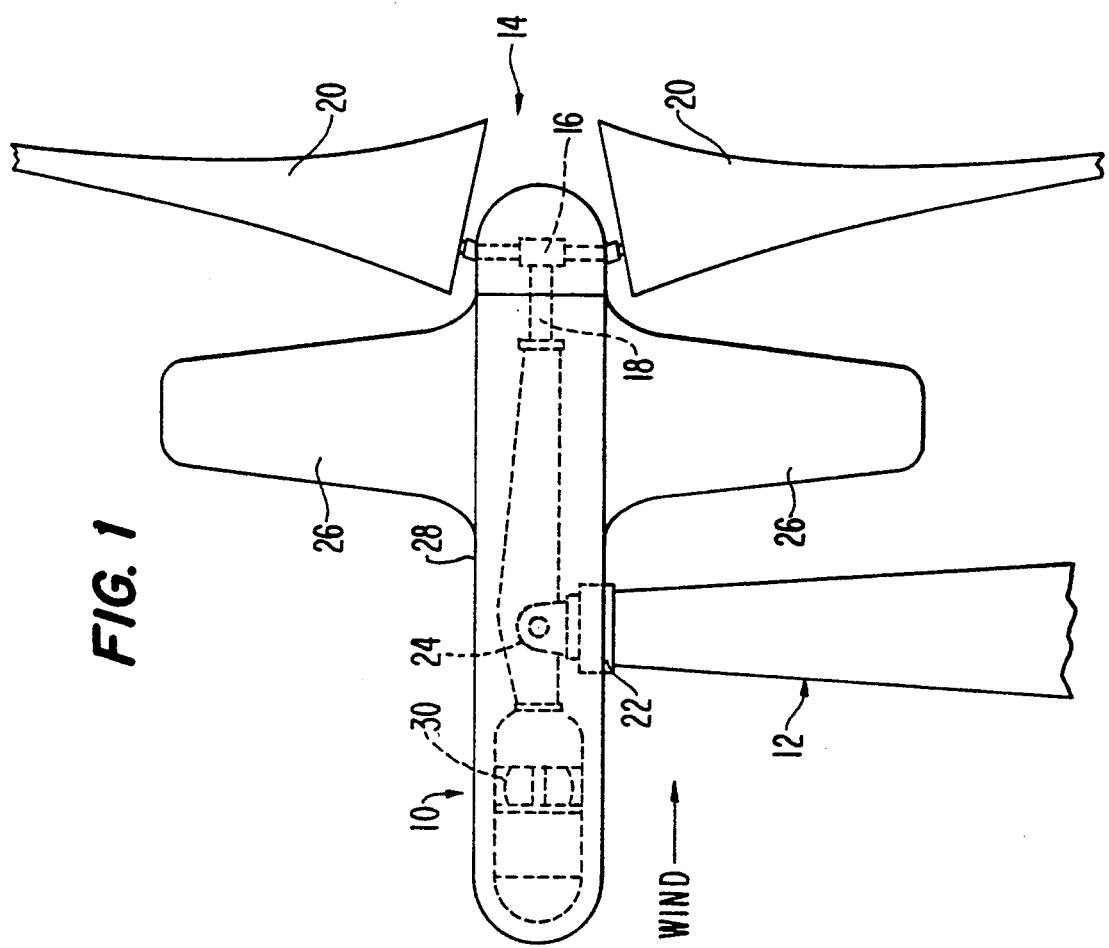

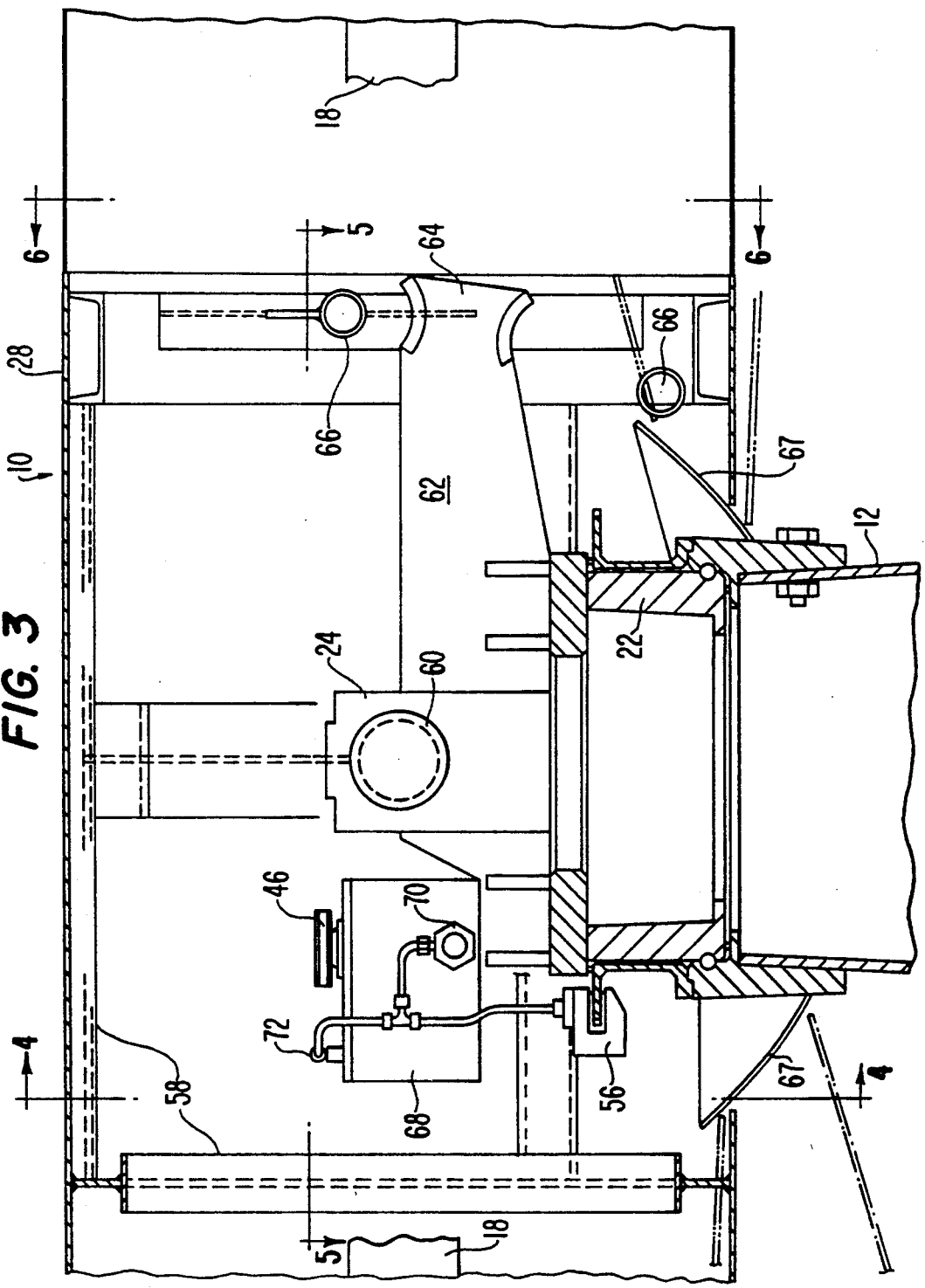

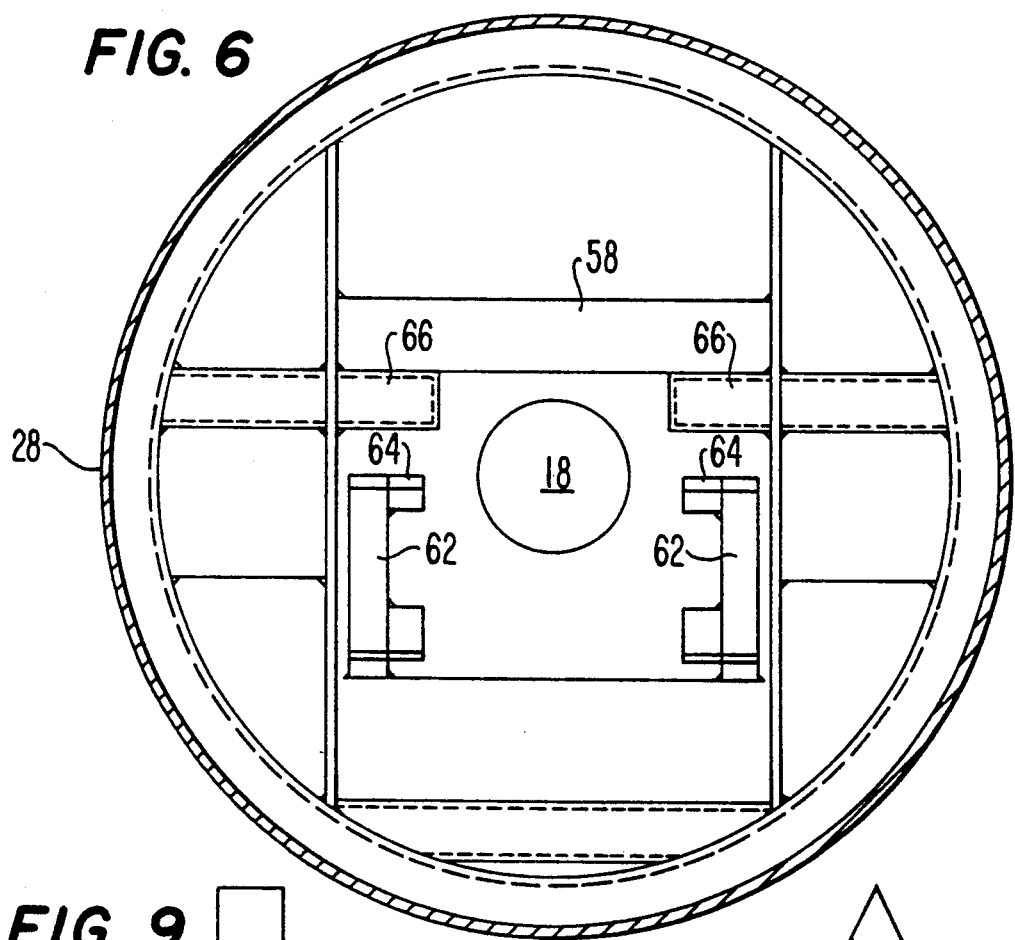
FIG. 6
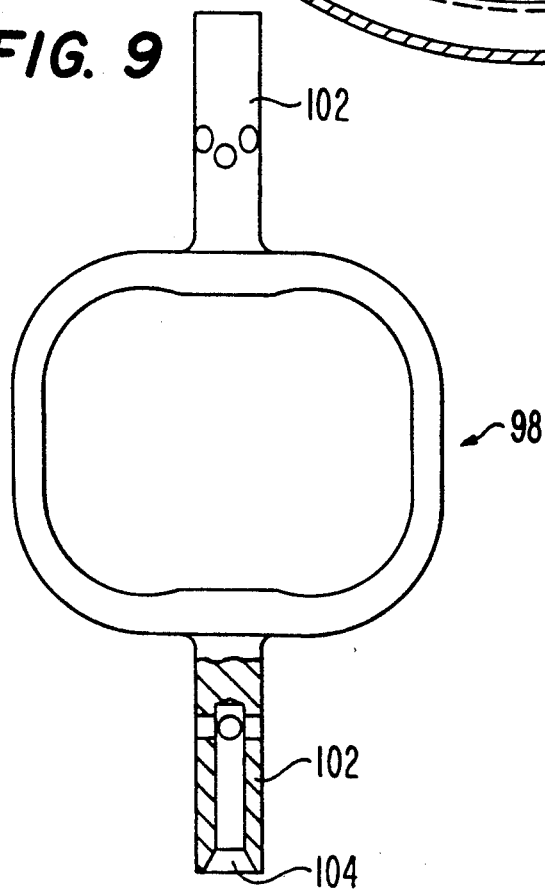
FIG. 9
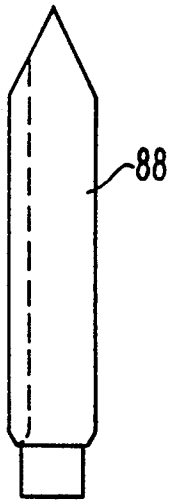
FIG. 10
FIG. 11

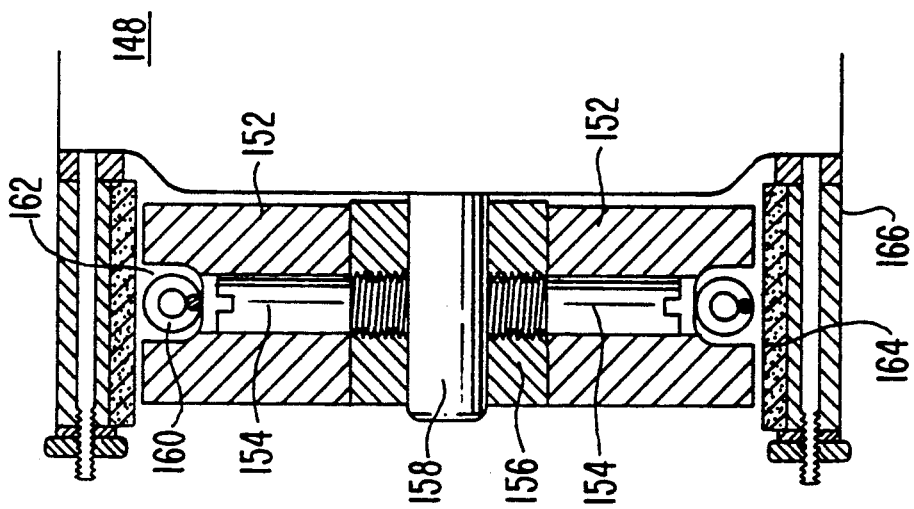
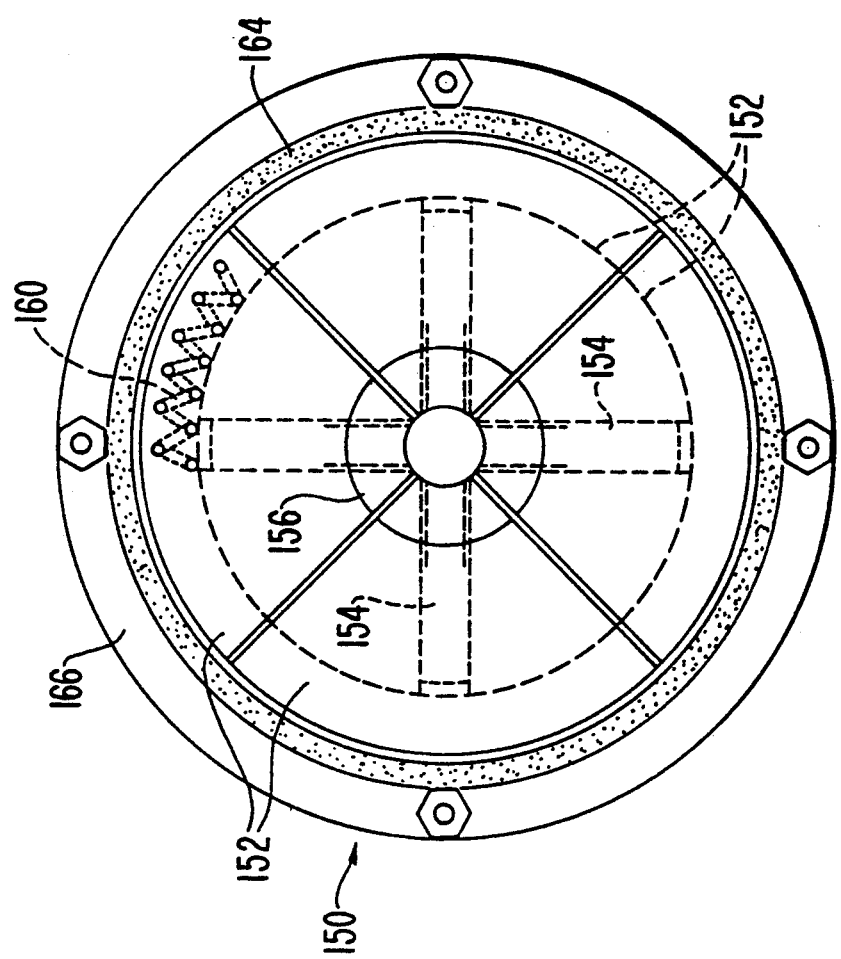

FREE-YAW, FREE-PITCH WIND-DRIVEN ELECTRIC GENERATOR APPARATUS

This is a continuation-in-part of application Ser. No. 246,199 filed Sep. 19, 1988, now abandoned.

BACKGROUND OF THE INVENTION

This invention is concerned with wind-driven electric generator apparatus, and more particularly with a downwind, free-yaw, free-pitch machine A free-yaw machine is very desirable, because it allows rotor blades to track the wind azimuthally and thereby generate electricity more efficiently by virtue of the fact that the blade tips rotate in a plane perpendicular to the wind when the wind direction is horizontal. However, downwind free-yaw machines have never been entirely satisfactory, because there are several conditions in which the blades may strike a support tower and destroy themselves. In general, these conditions are caused by an excessive yaw rate. In some locations, these conditions may occur three or four times a year.

In an effort to prevent an excessive yaw rate in free-yaw machines, yaw dampers have been used, but these devices impose a drag on the yaw movement even when the yaw movement is relatively slow, and machines employing such yaw dampers are not, strictly speaking, free-yaw machines. To avoid the disadvantages of free-yaw machines, yaw drive systems (with a yaw-sensing flag) have been employed to maintain the generator head azimuthally aligned with the wind. Such systems are complicated, expensive, and trouble-prone. Moreover, even with sophisticated yaw drive systems, inaccuracies in the yaw alignment at times causes the wind generator to run very roughly and to vibrate excessively, resulting in excessive stress and wear and tear on the machine.

For maximum efficiency, it is desired that the plane of rotation of the blade tips be maintained perpendicular to the wind direction, and when the wind direction is not horizontal, this requires elevational alignment as well as azimuthal alignment. Conventional machines that are designed to have a rotor axis that is maintained in a horizontal plane cannot take full advantage of the many good wind sites on the upslope of a mountain or hill, where the wind may come up the slope at an angle of 10° to 20° to the horizontal. In such environments the blades will be forced to operate at an angle to the airflow, with resulting decrease in efficiency and loss of power production. Moreover, a machine that is compelled to operate continuously with the blades at an angle to the wind is a very rough-running machine, with high stresses applied to various parts of the machine.

Many years ago it was discovered that a teetering rotor system on a helicopter or gyroplane operated much more smoothly and transmitted lower forces to the rotor-supporting structure of the machine. Modern wind-driven electric generators have used rotors with teetering hubs to provide the same advantages. The most efficient and cost effective wind-driven generators have employed a two-bladed teetering hub with flexible blades, the cone angle of which varies with wind velocity. The higher the wind velocity, the more the flexible blades cone.

When the rotor blades are forced to operate at an angle to the airflow, the blades must teeter about the teetering axis. If the teetering axis is spaced from the center of gravity of the rotor system, vibration and resultant high stresses occur. Due to changes in coning, the center of gravity of the rotor system changes with wind velocity, making it impossible to design a rotor system that always teeters about an axis coincident with the center of gravity of the rotor system. Moreover, teetering hubs are heavy, costly, and expensive to maintain.

While the blades of most modern wind-driven electric generators may be quite flexible with regard to coning, they require considerable edgewise stiffness to ensure that the edgewise natural frequency of the rotor is always greater than the rotational speed of the rotor. The rotor, as it revolves, is influenced by gravity twice per revolution, and if the natural frequency of the rotor is the same as or less than the rotational speed, it is possible for the rotor to become excited by the force of gravity and destroy itself in a few revolutions. Moreover, the natural frequency of the supporting tower must be low enough, or the tower stiff enough, to prevent vibration of the rotor from damaging the tower.

Conventional wisdom in the art has hypothesized that a 400 to 500 ft. diameter rotor may be a practical size limit, because as the blade length increases, the weight of the rotor increases much more rapidly than the edgewise stiffness, and as stated earlier, the edgewise stiffness of the blades must be sufficient to ensure that the edgewise natural frequency of the blades is greater than the rotational speed of the rotor.

BRIEF DESCRIPTION OF THE INVENTION

The present invention provides a wind-driven electric generator that runs more efficiently and more smoothly than has been possible in previous machines. Moreover, the invention contemplates the provision of rotors larger in diameter than heretofore possible, with much lower edgewise stiffness than presently required, eliminating or significantly reducing the natural frequency problems in rotor and tower design.

Briefly stated, in one of its aspects the invention provides an improved wind-driven electric generator with blades mounted on a hub that is rigidly attached to the rotor shaft, and in which the rotor has free-pitch movement within predetermined pitch limits. In a most preferred embodiment, the rate of travel of the rotor between pitch stops is hydraulically regulated when the pitch movement exceeds a small angular range.

In another of its aspects the invention provides an improved free-yaw wind-driven electric generator in which the rate of yaw is controlled to prevent an excessive yaw rate. In a most preferred embodiment, the electric generator has unrestrained free yaw within a small angular range (e.g., ±2°) and employs a unique yaw drive system to maintain the rotor blades downwind within ±45° of the wind direction in light and variable winds.

More particularly, the invention provides a free-yaw, free-pitch wind-driven electric generator of higher efficiency, simpler construction, and longer life than comparable machines of the prior art.

BRIEF DESCRIPTION OF THE DRAWINGS

The invention will be further described in conjunction with the accompanying drawings, which illustrate preferred and exemplary embodiments of the invention, and wherein:

FIG. 1 is a somewhat diagrammatic elevational view illustrating a generator head of the invention mounted on a tower (shown fragmentarily);

FIG. 2 is a somewhat diagrammatic elevational view illustrating a first embodiment of a yaw brake that may be employed in the invention;

FIG. 3 is a fragmentary vertical sectional view illustrating, in somewhat greater detail, the free-yaw, free-pitch mounting of the generator head on the tower, and also illustrating a second embodiment of a yaw brake that may be employed in the invention;

FIG. 6 is a transverse vertical sectional view taken along line 6—6 in FIG. 3;

FIG. 9 is a plan view, partly in section, of a scotch yoke employed in the second embodiment of the yaw brake;

FIG. 10 is an elevational view of a valve plunger employed in the second embodiment; and FIG. 11 is an end view of the valve plunger;

FIGS. 18 and 19 are somewhat diagrammatic transverse and longitudinal vertical sectional views, respectively, of a centrifugal brake for regulating yaw rate in the third embodiment.

DETAILED DESCRIPTION OF PREFERRED EMBODIMENTS

Figure 4:
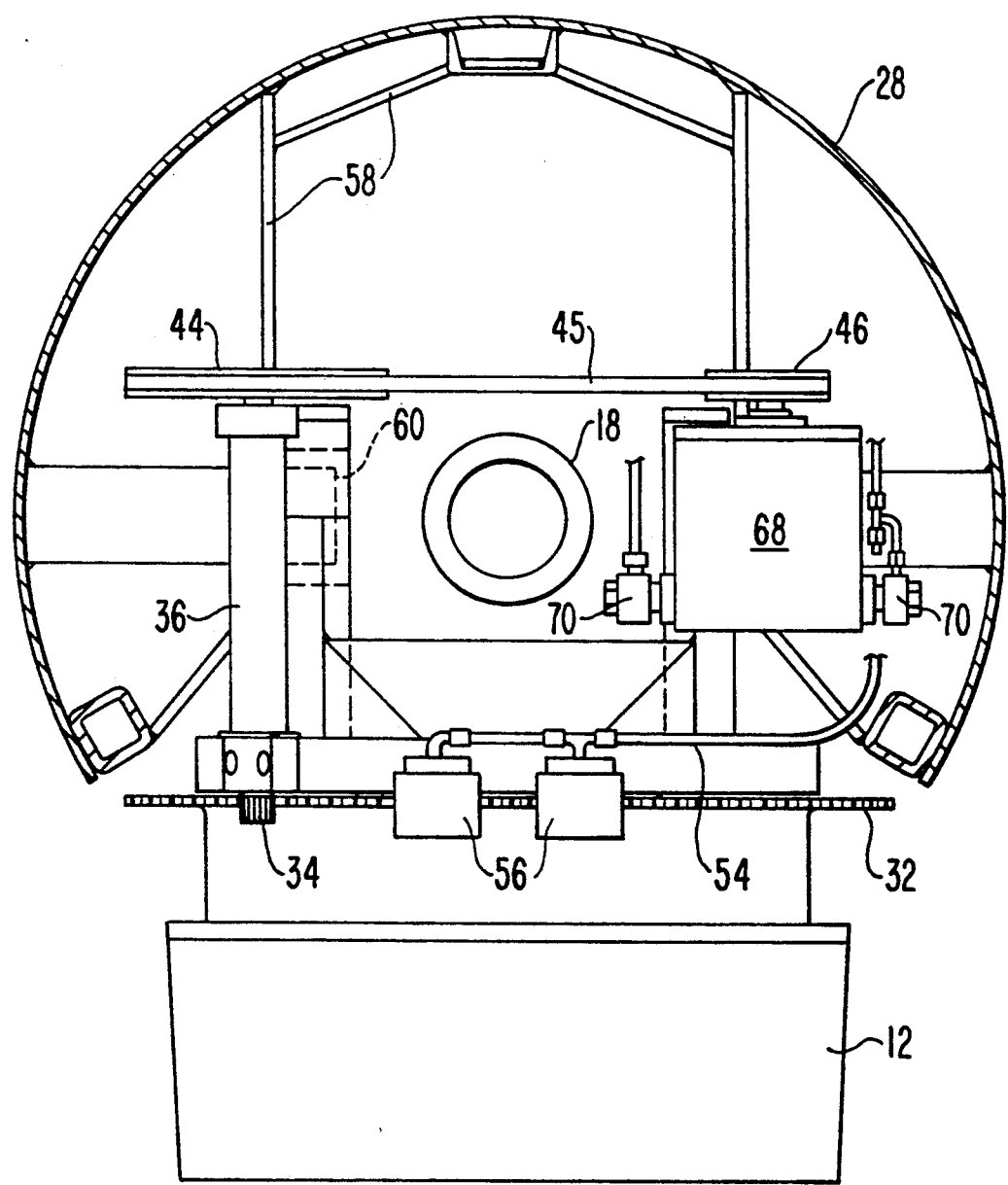
FIG. 4 is a transverse vertical sectional view taken along line 4—4 in FIG. 3.

Referring to the drawings, FIG. 1 illustrates, somewhat diagrammatically, a wind-driven electric generator machine in accordance with the invention. As shown, the machine includes a generator head 10 supported at the top of a tower 12 (shown fragmentarily). The generator head has a rotor 14 with a hub 16 rigidly attached to a rotor shaft 18 and supporting a pair of blades 20. The blades are elongated and flexible, with an efficient airfoil configuration, and preferably have a construction like that disclosed in U.S. Pat. No. 4,366,387 issued Dec. 28, 1982, or U.S. Pat. No. 4,431,375 issued Feb. 14, 1984, both of which are incorporated herein by reference in their entireties. However, the blades need not have the edgewise stiffness of the blades of the aforesaid patents, because the present invention alleviates the edgewise natural frequency problems associated with prior blades. As disclosed in the aforesaid patents, the blades preferably have a pitch control mechanism which maintains the pitch of the blades substantially constant during normal rotational speed of the blades but allows the blades to pitch up in an over-speed condition. As shown in FIG. 1, the wind approaches the generator head 10 from the left, and the blades 20 have a predetermined initial coning angle therebetween, the coning angle varying with wind velocity, as discussed in the aforesaid patents.

The generator head 10 is mounted on the tower 12 by means of a yaw bearing 22 that permits unrestrained free-yaw movement of the generator head about a substantially vertical axis, without restriction as to the extent of yaw movement. As will be seen hereinafter, however, the rate of yaw movement is limited to prevent an excessive yaw rate.

The generator head is supported on the yaw bearing 22 via a pitch bearing 24 that provides free-pitch movement of the generator head about a substantially horizontal axis within predetermined pitch limits (to be described). Vertical fins 26 extend upwardly and downwardly from the casing 28 of the generator head and have side surfaces that are substantially parallel to the axis of the rotor shaft 18. The fins assist in aligning the generator head (rotor shaft) with the wind direction azimuthally. The generator head may have a truss-type frame (not shown) to which the fins are attached.

The rotor shaft 18 is supported in the casing 28 for rotation in a conventional manner and has, at its end opposite to the rotor 14, an electric generator unit 30 that may include a conventional gear train. The generator head is statically balanced about its pitch axis, and if the wind direction shifts from a horizontal plane, the natural operation of the rotating blades 20 causes pitch movement of the generator head to maintain the plane of rotation of the blade tips substantially perpendicular to the wind direction.

To prevent the types of problems referred to earlier that are associated with excessive yaw rate, the generator head is provided with a yaw brake, a first embodiment of which is illustrated somewhat diagrammatically in FIG. 2. As shown, a large diameter brake disk gear 32, with external gear teeth, is fixed to the upper non-rotating section of the tower 12. A small pinion gear 34 has teeth meshed with the teeth of gear 32. The pinion gear has a shaft that rotates in a sleeve 36 mounted on a support 38 that rotates with the generator head about the vertical axis of the yaw bearing 22. Thus, the rotational speed of the pinion gear 34 varies with the rate of yaw movement of the generator head.

Through a belt and pulley system 40 the pinion gear 34 drives a fly-weight unit 42 which is mounted on support 38 and which has fly weights that rotate about a vertical axis parallel to the axis of rotation of the pinion gear at a rotational speed determined by the size of the driving and driven pulleys 44,46, respectively, which are coupled by belt 45. Fly weights 48 rotate with a hub 50 attached to pulley 46 and move out radially due to centrifugal force. Gear teeth on the upper end of the fly weights drive a gear rack (not shown) that moves vertically in the hub 50 and that exerts a downward force on a piston (not shown) in a hydraulic cylinder 52 (e.g., like the master cylinder of the hydraulic braking system of an automobile). Hydraulic fluid trapped beneath the piston is forced through tubing 54 to one or more brake-pad caliper units 56 mounted on the support 38. Each caliper unit clamps the disk 32 to exert a braking force thereon.

The generator head has true free-yaw movement until a predetermined yaw rate is reached, at which point the yaw brake acts to prevent an excessive yaw rate. If the generator head is yawing slowly back and forth to follow the wind direction, then the fly-weight unit never attains enough RPM to lift the fly weights appreciably, as required to actuate the hydraulic brake, so the wind generator is able to follow the wind freely and without restraint, for most efficient operation. If unusual weather conditions cause the machine to start yawing too rapidly, the brake will come into play and maintain a safe yaw rate, thus preventing the blades from becoming damaged or destroyed. This system has a built-in feed-back, so that the faster the machine tries to yaw, the faster the fly-weight unit will turn, and the greater the braking force that will be applied (after the brake begins to act). The fly-weight unit or other parts of the yaw brake may incorporate an adjusting spring, for example, or other appropriate adjustment mechanism to facilitate the setting of a braking threshold.

Although the yaw brake has not been illustrated in FIG. 1, so as not to confuse the diagrammatic showing in that figure, the arms of the pitch bearing 24 will be mounted relative to the support 38 in FIG. 2 to provide the desired free-pitch movement of the generator head (i.e., the rotor shaft and the parts of the generator head that move in pitch therewith), and the support 38 will have an appropriate central opening (not shown) for passage of the rotor shaft with sufficient freedom to provide the desired pitch movement of the rotor shaft. How this may be achieved in practice will become apparent from the description of a second embodiment of the yaw brake, with further details of the construction of the generator head, hereinafter.

Figure 5:
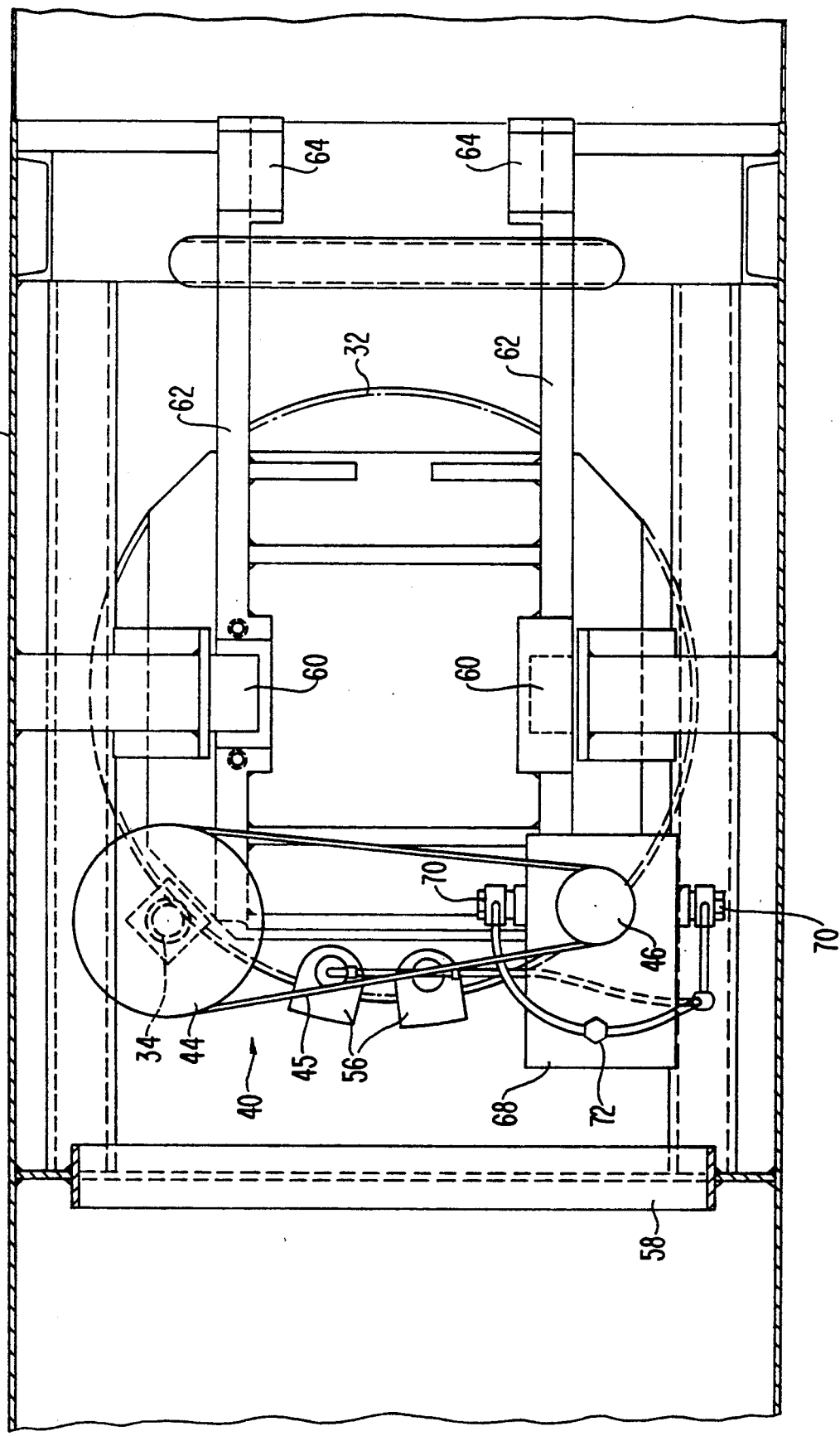
FIG. 5 is a longitudinal horizontal sectional view taken along line 5—5 in FIG. 3.

As shown in FIGS. 3–6, the casing 28 has a frame 58 supported on the movable portion of the yaw bearing by means of a pair of trunnions 60 (see FIG. 5). Longitudinal arms 62 mounted on the movable portion of the yaw bearing 22 extend in the direction of the rotor (rightwardly in FIGS. 3 and 5) and support bumpers 64 that engage abutments 66 fixed to the frame 58 so as to provide upward and downward limit stops for the pitch movement of the generator head. In practice, the upward movement may be limited to about 15° to 20° to horizontal, for example, and the downward movement may be limited to about 3° to 5° to horizontal, for example. The upward and downward pitching movement of the generator head is shown in FIG. 3 by phantom lines adjacent to arcuate cowling 67 fixed to the upper portion of the tower 12.

The hydraulic brake system of the second embodiment illustrated in FIGS. 3–11 is a more sophisticated system than that of the first embodiment and is a type of servosystem that permits the use of a more sensitive, lighter weight yaw rate sensor than the fly-weight unit of the first embodiment. The brake system of the second embodiment includes a fluid reservoir 68, pumps 70 for pumping hydraulic fluid to brake calipers 56, and a fluid by-pass including a control valve assembly 72 that regulates the rate at which fluid is by-passed back to the reservoir 68 from the pumps 70.

Figure 7:
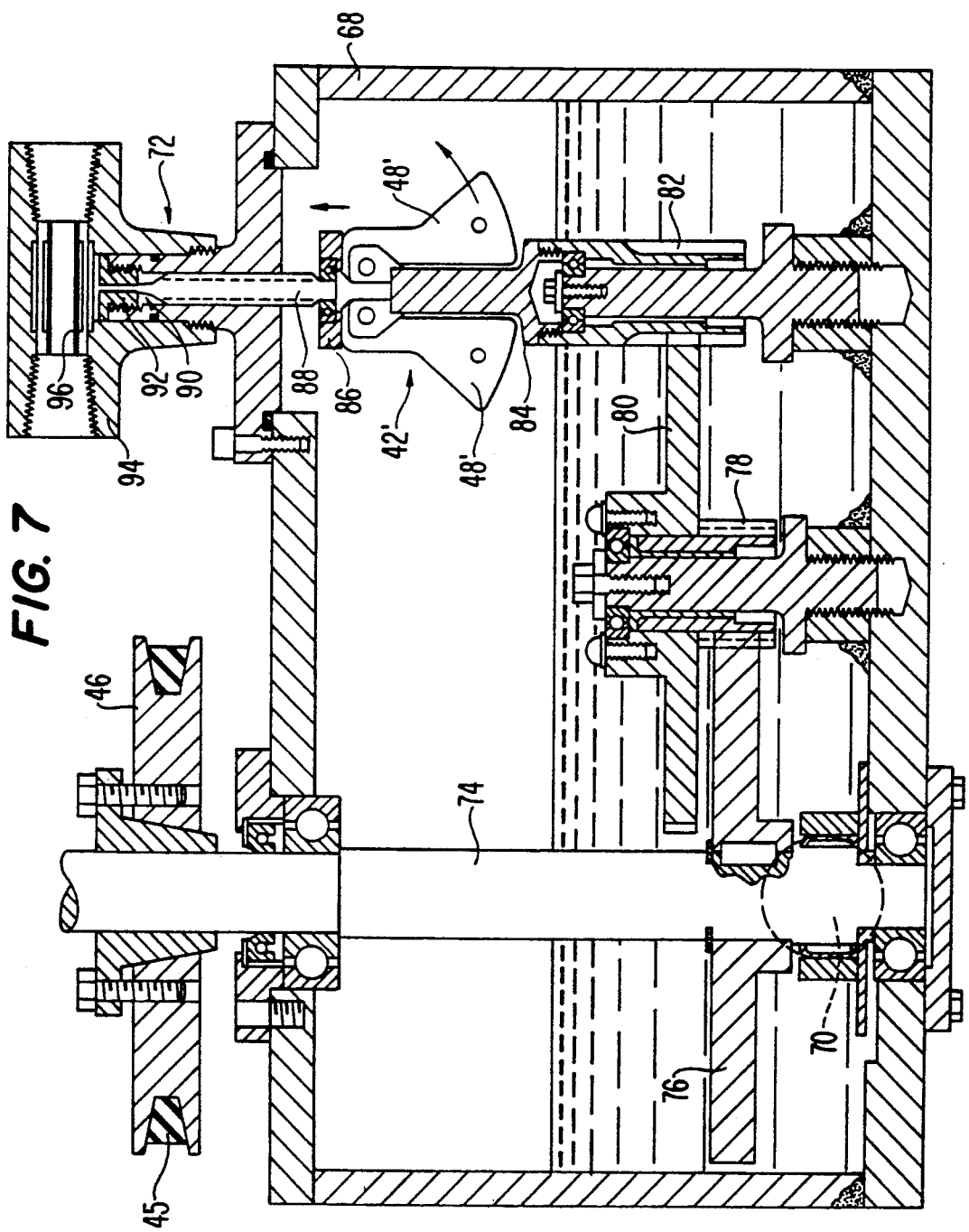
FIG. 7 is a longitudinal vertical sectional view illustrating details of the second embodiment of the yaw brake.

As shown in FIGS. 4 and 5, pinion gear 34 meshed with the disk gear 32 rotates drive pulley 44 of belt and pulley system 40, which, through the belt 45, rotates driven pulley 46. As shown in FIG. 7, the driven pulley 46 is fixed to a shaft 74 on which a gear 76 is mounted. This gear drives a gear 78 fixed to a gear 80, which drives a further gear 82 mounted on the drive shaft 84 of a fly-weight unit 42'. The drive shaft supports fly weights 48' which fly out under centrifugal force when the drive shaft of the fly-weight unit is rotated. While two fly weights 48' are shown supported on the drive shaft 84 in FIG. 7, there may be two additional fly weights supported on the drive shaft for movement in a radial plane perpendicular to the radial plane of movement of the fly weights 48'.

The upper ends of the fly weights 48' serve as cams that engage a collar 86 to move the collar vertically along the axis of the drive shaft 84. The configuration of the cams may determine the yaw rate threshold at which the brake begins to act. The collar rotates about the axis of the drive shaft 84 and supports a plunger 88 of a control valve 90, by means of a rotational bearing centrally of the collar. The plunger 88 moves up and down with the collar 86 and has a tapered tip controlling the flow of hydraulic fluid through a passage of a cooperable valve member 92. As shown in FIGS. 10 and 11, the plunger may have a cruciform cross section to provide longitudinal passages for the flow of hydraulic fluid.

Figure 8:
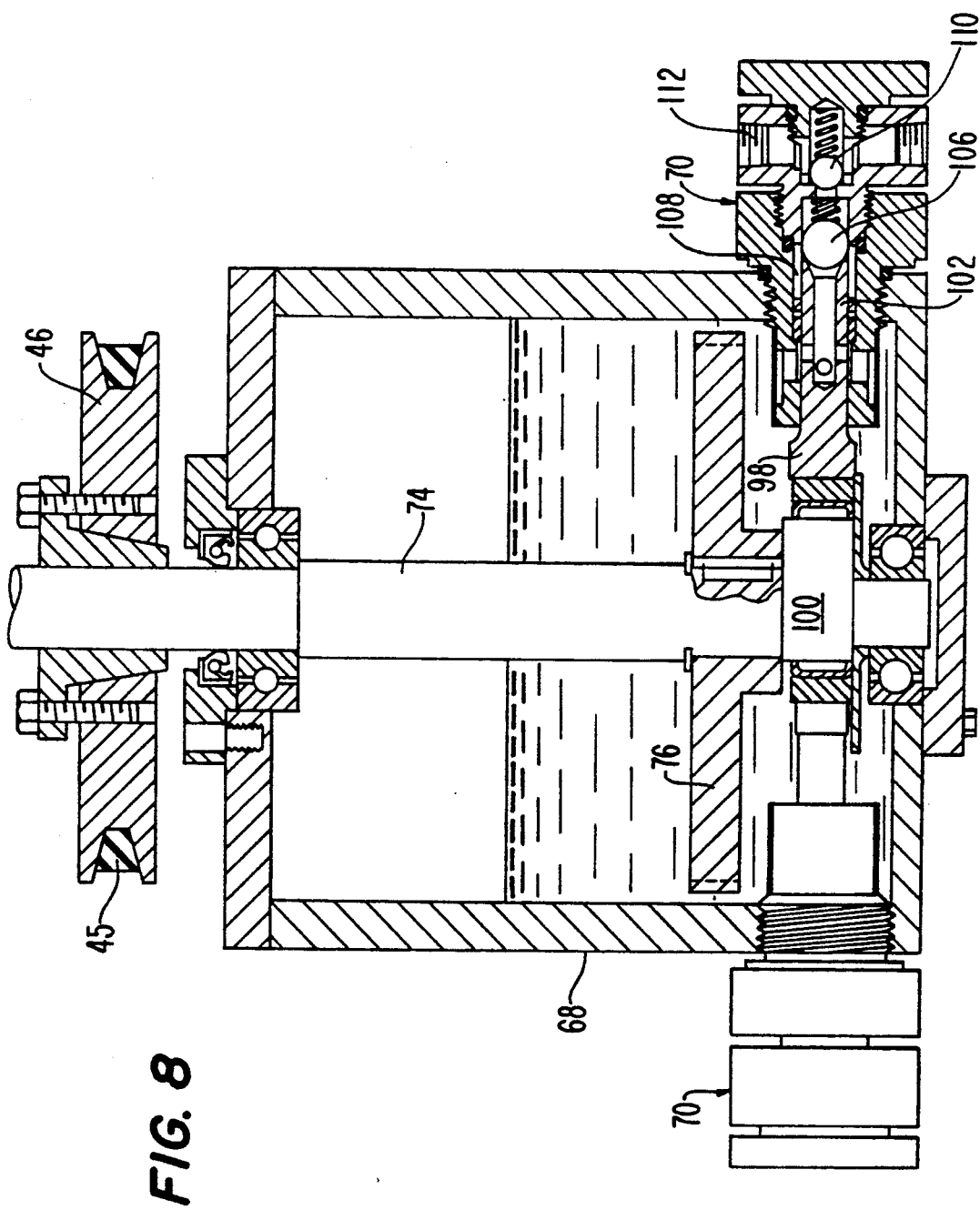
FIG. 8 is a transverse vertical sectional view illustrating details of the second embodiment of the yaw brake.

The control valve 90 is mounted on a fitting 94 of the control valve assembly 72, having a passage in which a screen 96 is supported so as to screen hydraulic fluid by-passed to the reservoir 68 through the control valve. Hydraulic fluid may enter the right side of the fitting 94 in FIG. 7 and pass out of the left side of the fitting to one or more of the brake caliper units, the pressure of the hydraulic fluid applied to the brake caliper units being determined by the extent to which fluid is by-passed to the reservoir through the control valve. This, of course, is a function of the radial position of the fly weights 48', which in turn is a function of the rate of yaw movement of the generator head As shown in FIG. 8, the hydraulic brake system may include a pair of mechanically driven piston pumps 70 supported at opposite sides of the reservoir 68. The pistons of the pumps are driven by a scotch yoke mechanism that includes a yoke 98 and cam 100 on the shaft 74. Yoke 98, shown in greater detail in FIG. 9, has a pair of oppositely extending hollow rods 102 that are longitudinally and transversely bored, as shown. The end of each longitudinal bore is enlarged to form a cup 104 that receives a spring-loaded ball 106 of a check valve as shown in FIG. 8. When the shaft 102 at the right side of FIG. 8 moves leftwardly, negative pressure is created in the chamber containing the ball, and fluid from the reservoir 68 passes through the hollow rod 102 and around the ball (which is now lifted away from the cup 104) via passages 108. On the return stroke of the shaft 102 (when the shaft moves to the right at the right side of FIG. 8) fluid trapped to the right of ball 106 moves a second spring-loaded ball 110 of a further check valve to the right (off of its valve seat) and forces hydraulic fluid into a passage 112. One end of this passage may be connected to the fitting 94 of the control valve 90 (FIG. 7) and the other end of passage 112 may be connected to one or more brake caliper units. Alternatively, the outputs of the two pumps 70 shown in FIG. 8 may be connected in parallel, as by using the passage 112 of one of the pumps to receive the output of the other of the pumps before supplying both outputs to the brake caliper units from that passage 112.

The hydraulic brake system of the second embodiment, like that of the first embodiment, permits true free-yaw movement of the generator head until the yaw rate reaches a predetermined level, at which point the brake system acts to prevent an excessive yaw rate. As in the first embodiment, the hydraulic brake system of the second embodiment provides feed-back, so that once the brake begins to act, the braking force varies with the yaw rate. Although the hydraulic brake system of the second embodiment is more complicated in certain respects than that of the first embodiment, more precise control of the braking force and more sensitive response to the rate of yaw movement of the generator head are achieved.

With free pitch and free yaw, no teetering hub is required, and it is not important to have a rotor perfectly balanced about the axis of rotation, because the rotating shaft is free to move about the center of gravity of the rotor. Since the rotor shaft is "soft" in both horizontal and vertical directions, there will be no "hard" point to start vibrations.

A third, most preferred embodiment of the invention will now be described. In describing this embodiment, parts corresponding to parts of the previous embodiments will be designated by the same reference numerals, but primed.

Figure 12:
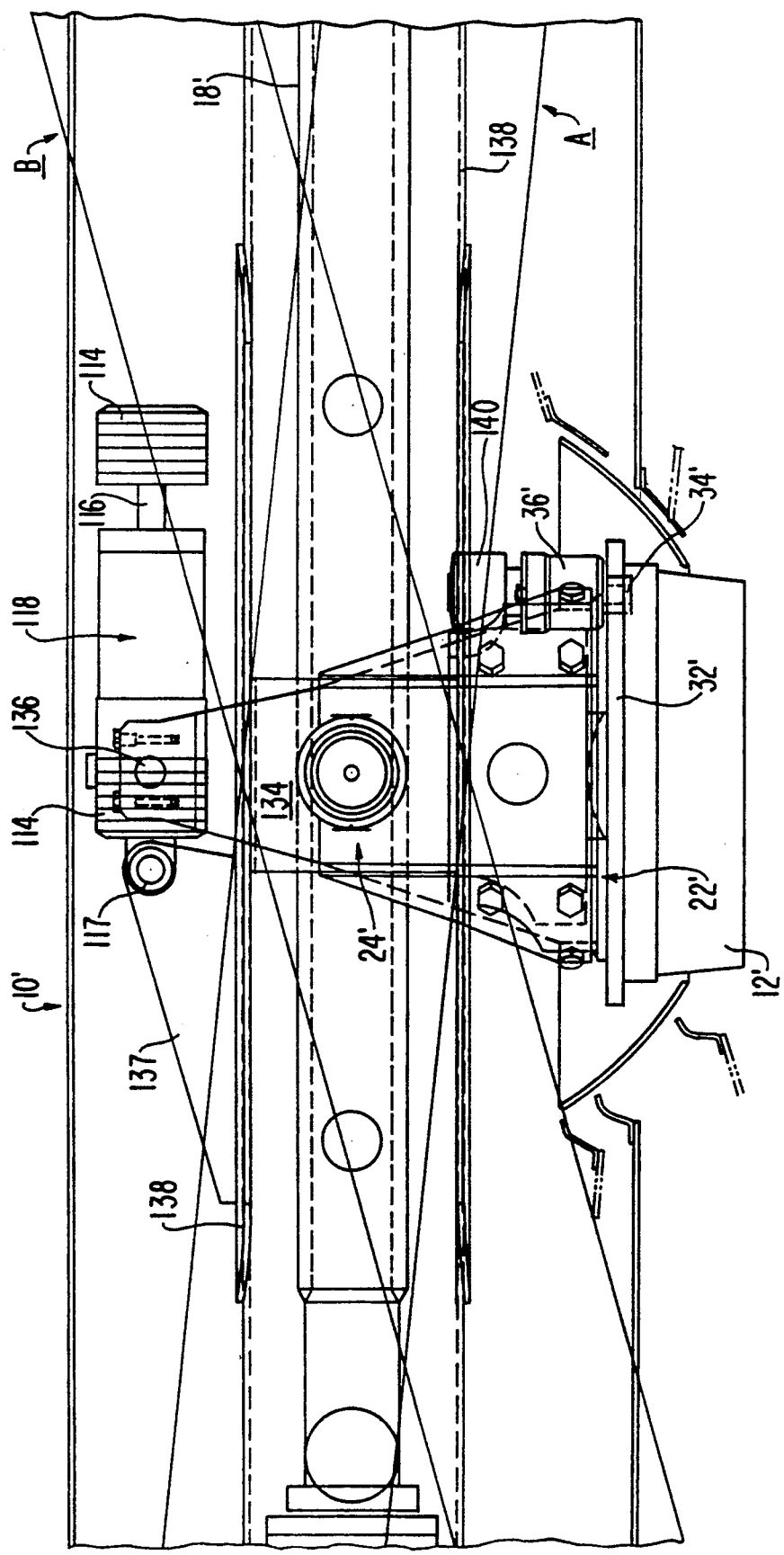
FIG. 12 is a somewhat diagrammatic longitudinal vertical section view illustrating a portion of a modified generator head in a third, most preferred embodiment of the invention.
Figure 13:
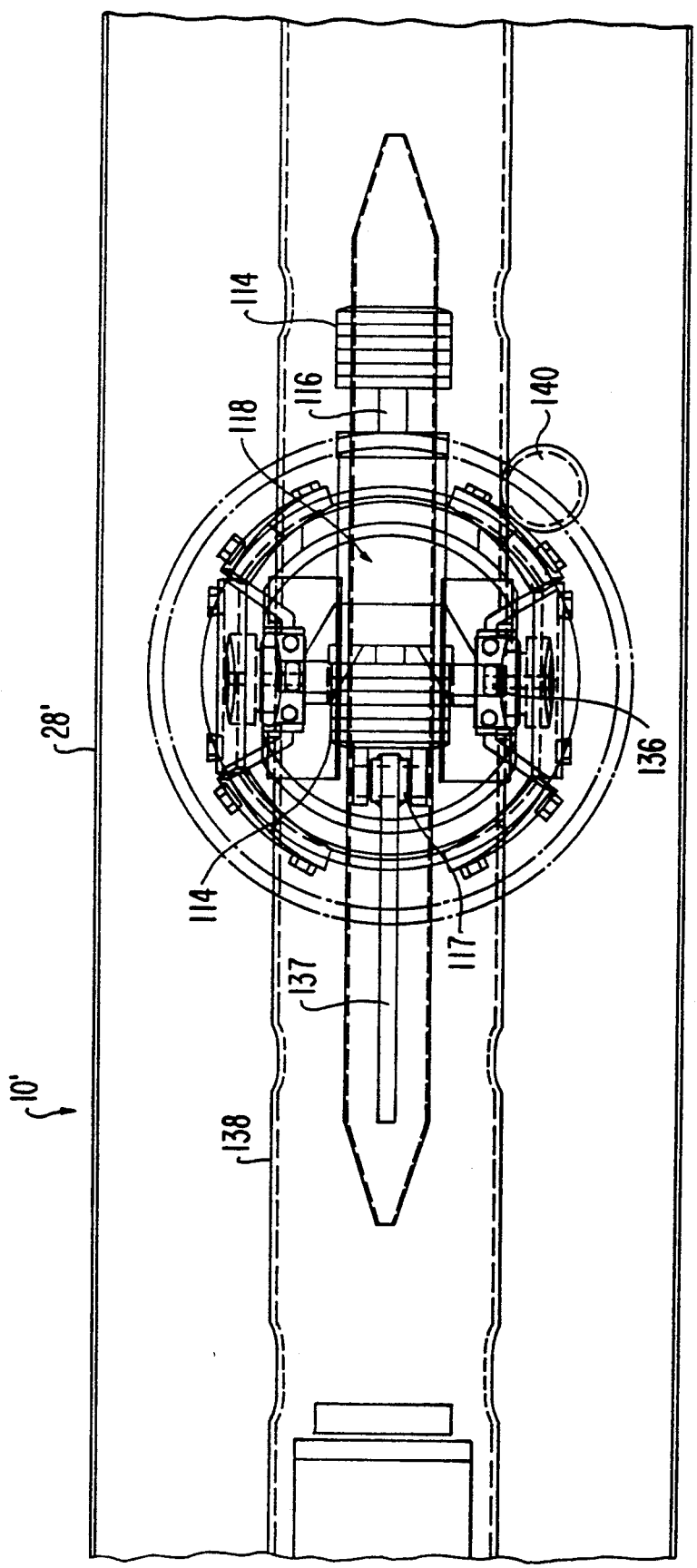
FIG. 13 is a somewhat diagrammatic horizontal sectional view of the generator head of the third embodiment.
Figure 14:
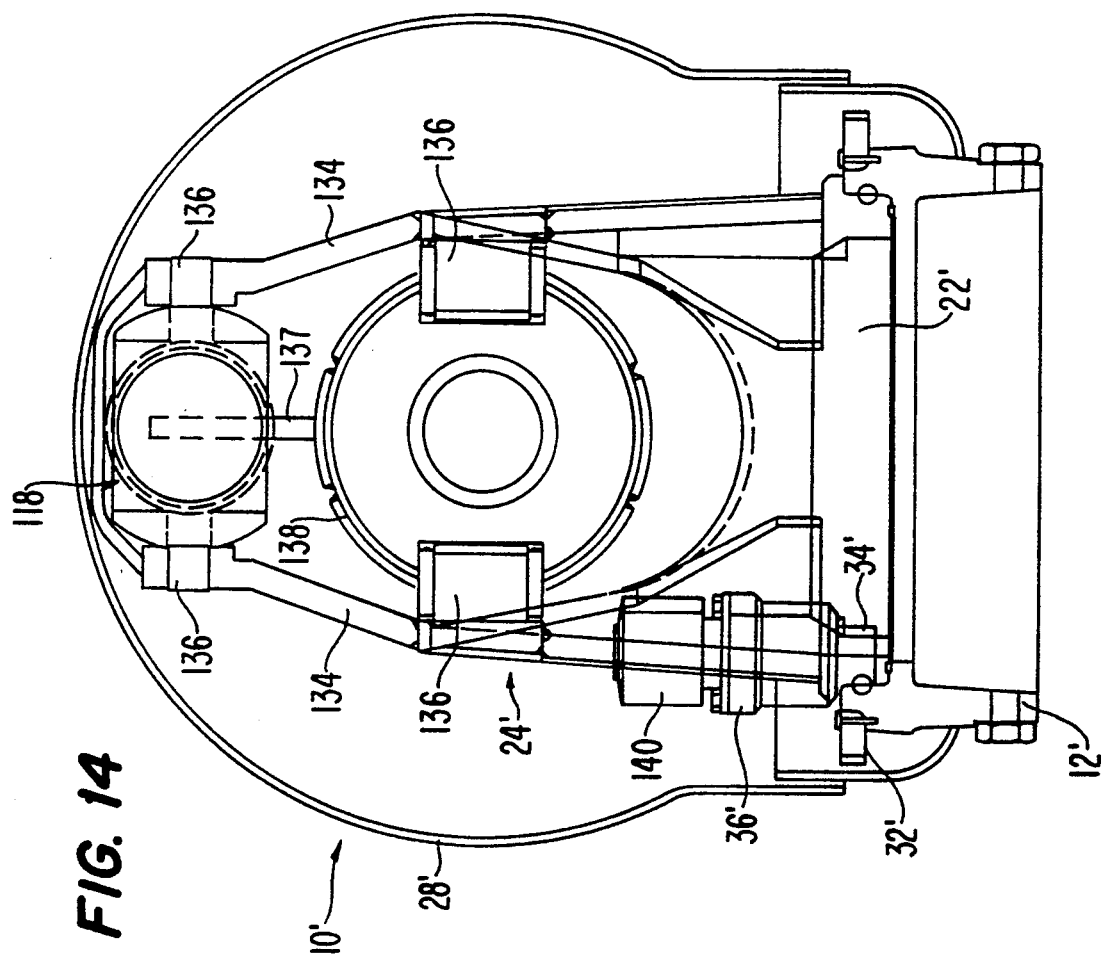
FIG. 14 is a somewhat diagrammatic transverse vertical sectional view of the apparatus shown in FIGS. 12 and 13.

As shown in FIGS. 12-14, the generator head 10' is supported on a yaw bearing 22' via a pitch bearing 24'. A rotor shaft 18' supports a rotor (not shown) having a hub rigidly attached to the rotor shaft and supporting rotor blades, the rotor being located to the right of FIGS. 12 and 13. The general configuration of the generator head is substantially the same as that shown in FIG. 1, both the fins 26 are not employed. The blade structure is as described in connection with FIG. 1. The rotor shaft 18' drives an electric generator unit as in FIG. 1, the generator unit being located to the left of FIGS. 12 and 13.

In the third embodiment, pitch movement of the generator head is preferably limited to approximately $-6°$, as indicated by the downward position A of the shaft-supported tube 138 in FIG. 12, and approximately $+15°$, as indicted by the upward position B of the shaft-support tube in FIG. 12, both other limits may be used, as in the earlier embodiments. Limit stops for pitch movement are provided by bumpers comprising stacks of rubber donuts (disks) 114 interleaved with aluminum washers 115 and mounted on the ends of a double-ended piston rod 116 of a hydraulic cylinder 118.

Figure 15:
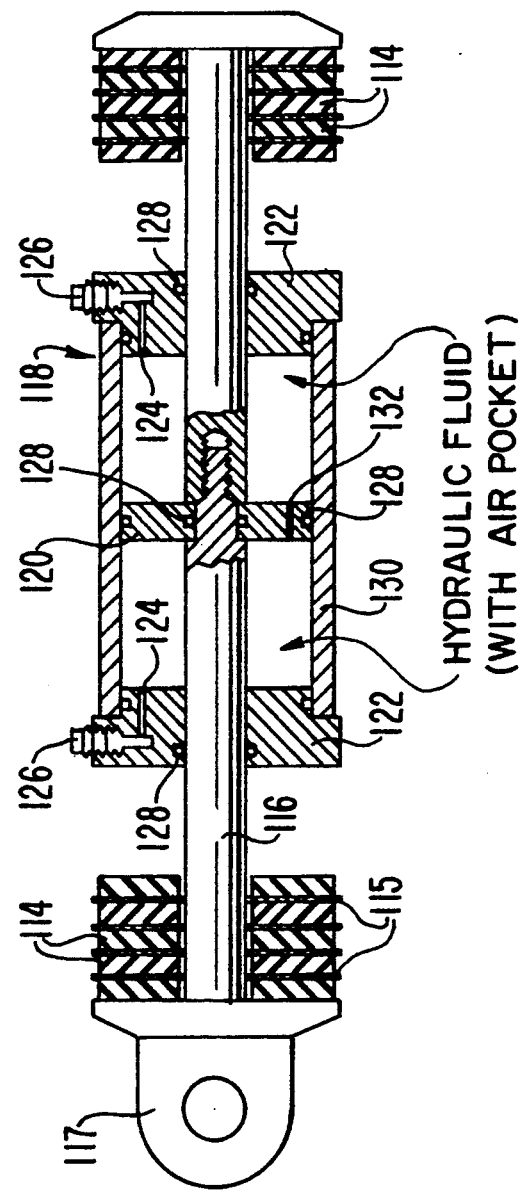
FIG. 15 is a somewhat diagrammatic longitudinal vertical sectional view of a pitch stop and hydraulic pitch rate regulation mechanism employed in the third embodiment.

As shown in FIG. 15, the piston rod supports a piston 120 in the hydraulic cylinder. The cylinder has end caps 122 provided with fill passages 124 that are closed by threaded plugs 126. O-rings 128 provide seals between the end caps and the side wall 130 of the cylinder, between the piston 120 and the side wall, and between the piston rod 116 and the end caps and the piston. A small diameter passage or orifice 132 is provided between opposite sides of the piston, near the lowermost region of the piston, for the transfer of low temperature, low viscosity hydraulic fluid from one side of the piston to the other as the piston moves in the cylinder. The cylinder is partially filled with hydraulic fluid at opposite sides of the piston 120, but a small pocket of air is trapped at each end of the cylinder.

Near one of its ends the cylinder is pivotally supported on a pair of arms 134 of the pitch bearing 24' by means of trunnions 136 as shown in FIGS. 12-14. One end 117 of piston rod 116 is pivotally connected to a plate 137 that is fixed to shaft-support tube 138, so that the plate 137 partakes of the pitch movement of the generator head. By virtue of this arrangement, pitch movement of the generator head causes reciprocative movement of the piston 120 in the hydraulic cylinder 118, and transfer of oil through orifice 132 for pitch movement rate control and damping. Reciprocative movement of the piston is accompanied by tilting of the hydraulic cylinder about the trunnion axis and is limited by engagement of the donuts 114 with the corresponding end caps 122 of the cylinder. The piston 120 never bottoms out against the end caps.

The air pockets at the respective ends of the cylinder allow pitch movements within a small angular range (e.g., about $\pm\frac{1}{2}°$) without an pitch rate regulation. If the pitch movement exceeds this small angular range, pressure builds up in the cylinder and starts to restrict the rate of pitch movement. By selecting an appropriate size of the orifice 132, the rate of pitch movement is desirably controlled. Because the cylinder is substantially horizontal, with orifice 132 near the bottom of the oil, the air can not enter the orifice and remains trapped.

The third embodiment of the invention has been designed to have unrestrained free yaw for a small angular range, of, e.g., approximately $\pm 2°$, and then to provide yaw damping. The unrestrained free yaw, together with the unrestrained free pitch just described, allows one free oscillatory movement of the rotor so that excessive loads are not applied to the machine from the rotating blades (the center of gravity of which may shift due to the fact that one blade may have a coning angle different from the other). Both the yaw and pitch damping are important in minimizing instability during start-up of the wind generator, when the blades are turning slowly. The third embodiment employs an electric powered hydraulic yaw drive system to keep the rotor downwind, with the rotor shaft axis within approximately $\pm 45°$ of the wind direction light and variable winds. The yaw drive system includes a centrifugal brake to limit the yaw rate to approximately 180° per minute.

Figure 16:
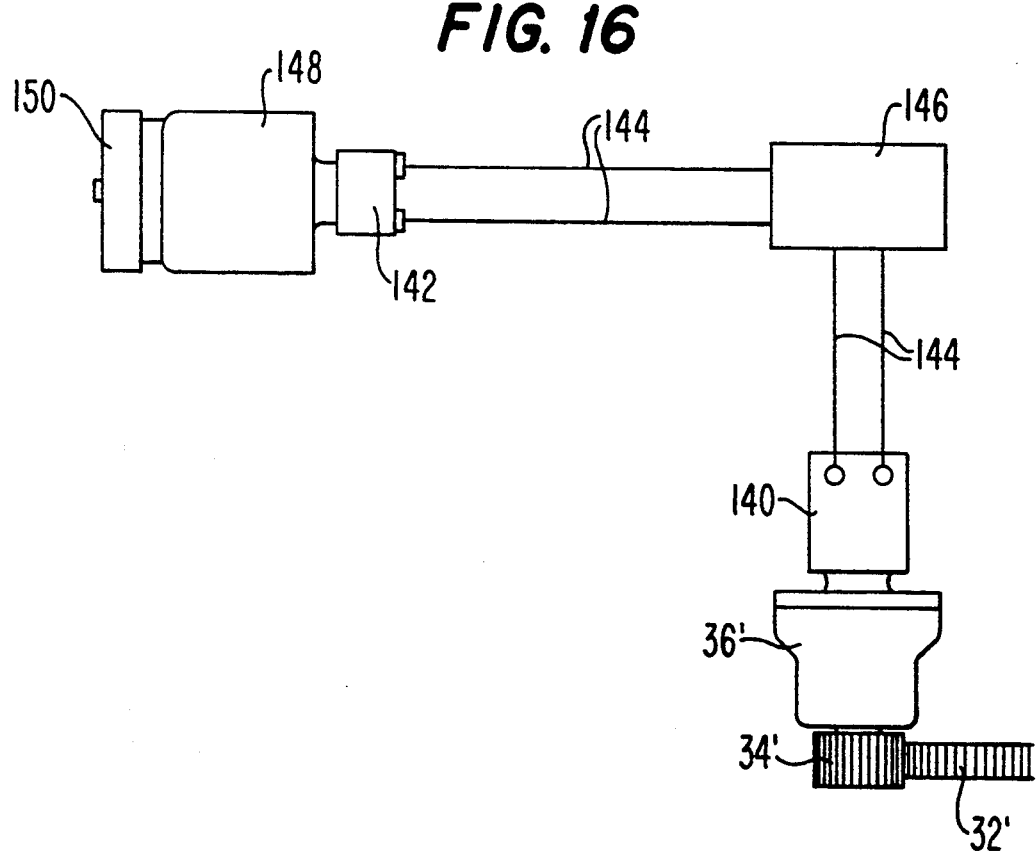
FIG. 16 is a diagrammatic elevational view of a yaw drive, yaw rate regulating, and yaw brake system employed in the third embodiment.

As shown in FIGS. 12, 14 and 16, a small pinion gear 34' meshes with a large diameter external gear 32' fixed to the non-rotating upper section of the tower 12'. The pinion gear has a shaft that rotates in a sleeve 36' that moves with the generator head about the vertical axis of the yaw bearing 22'. The shaft of the pinion gear is connected to the rotor of a hydraulic motor/pump unit 140. This unit is driven as a pump by the pinion gear in response to wind-driven yaw movement of the generator head. The hydraulic motor/pump unit is connected to a smaller capacity pump/motor unit 142 via oil lines 144 and a pressure relief manifold 146. The aforementioned small angular range of unregulated yaw movement is obtained by virtue of the fact that a certain amount of rotation of the pinion gear 34' is required before the hydraulic pressure builds up in the system. Then the output of unit 140, acting as a pump, drives unit 142 as a motor, which damps the yaw movement.

Unit 142 has an associated reversible, three phase electric motor 148 ($\frac{1}{8}$ HP$-$1755 RPM) for driving the unit as a pump. The shaft of the electric motor is also coupled to a centrifugal brake 150. All of the apparatus shown in FIG. 16, from the pinion gear 34' through the centrifugal brake 150 is, of course, supported on the yaw bearing and partakes of the yaw movement of the generator head.

Figure 17:
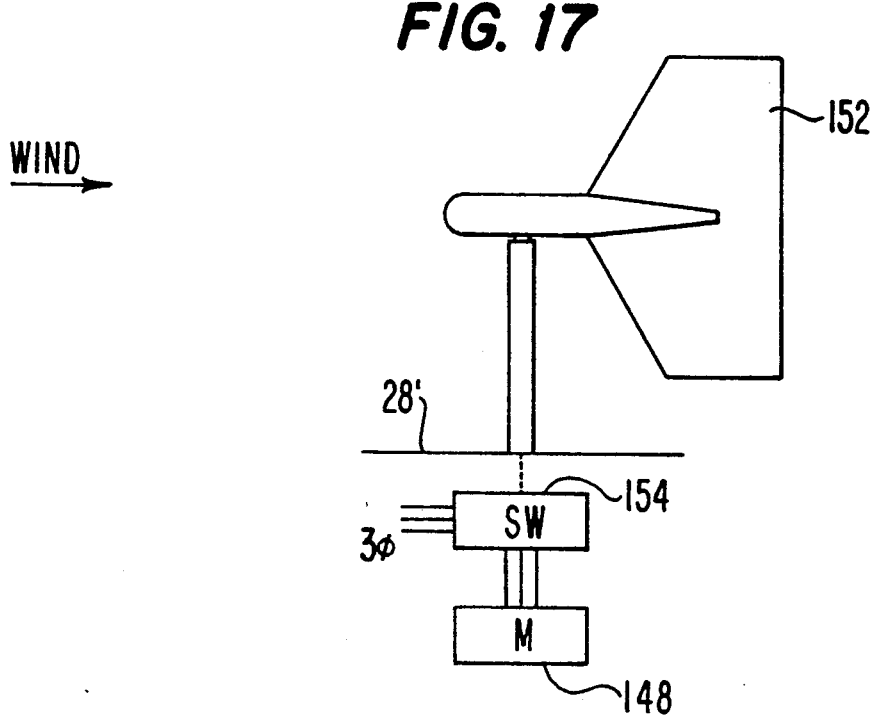
FIG. 17 is a diagrammatic view illustrating an electrical portion of the yaw drive system.

A yaw flag (wind vane) 152 is mounted on the casing 28' of the generator head, as shown in FIG. 17, near the end of the casing remote from the rotor blades. The yaw flag operates a reversing microswitch unit 154 so as to supply three phase AC to the motor 148 to drive the motor in an appropriate direction whenever the generator head is more than 45° off of the wind direction. The microswitch cam contour may be selected to that when the switch unit is closed to apply power to the motor, it remains closed for a period of time sufficient to drive the generator head through about 15° of yaw movement, i.e., until the generator head is within about 30° of the wind direction.

When electric motor 148 is energized, it drives the hydraulic pump/motor unit 142 as a pump, which, in turn, drives the hydraulic motor/pump unit 140 as a motor, in order to drive the pinion gear 34' around the fixed yaw gear 32'. However, if the wind causes yaw movement of the generator head, which sometimes happens in unusual wind conditions, the pinion gear will drive the hydraulic motor/pump unit 140 as a pump, which, in turn, will drive the hydraulic pump/motor unit 142 as a motor, thereby providing yaw damping. If the RPM of unit 142, and consequently the shaft of electric motor 148, exceeds, e.g., 1800 RPM, then the centrifugal brake 150 will come into play and maintain an RPM of less that 1850 RPM, thereby limiting the yaw rate.

If the wind force on the generator head is great enough, then the hydraulic pressure in the system may increase to a level that is destructive. The pressure relief manifold 146 relieves pressure in the oil lines 144 so as to protect both of the units 140 and 142 and the gears form excessive torque. If, during wind-driven yaw movement of the generator head, the wind direction shifts sufficiently to energize the electric motor 148, the starting torque of the motor is great enough to drive the hydraulic pump/motor unit 142 as a pump and thereby to drive the hydraulic motor/pump unit 140 as a motor, so as to correct any gross misalignment of the generator head with respect to the wind direction.

Figure 20:
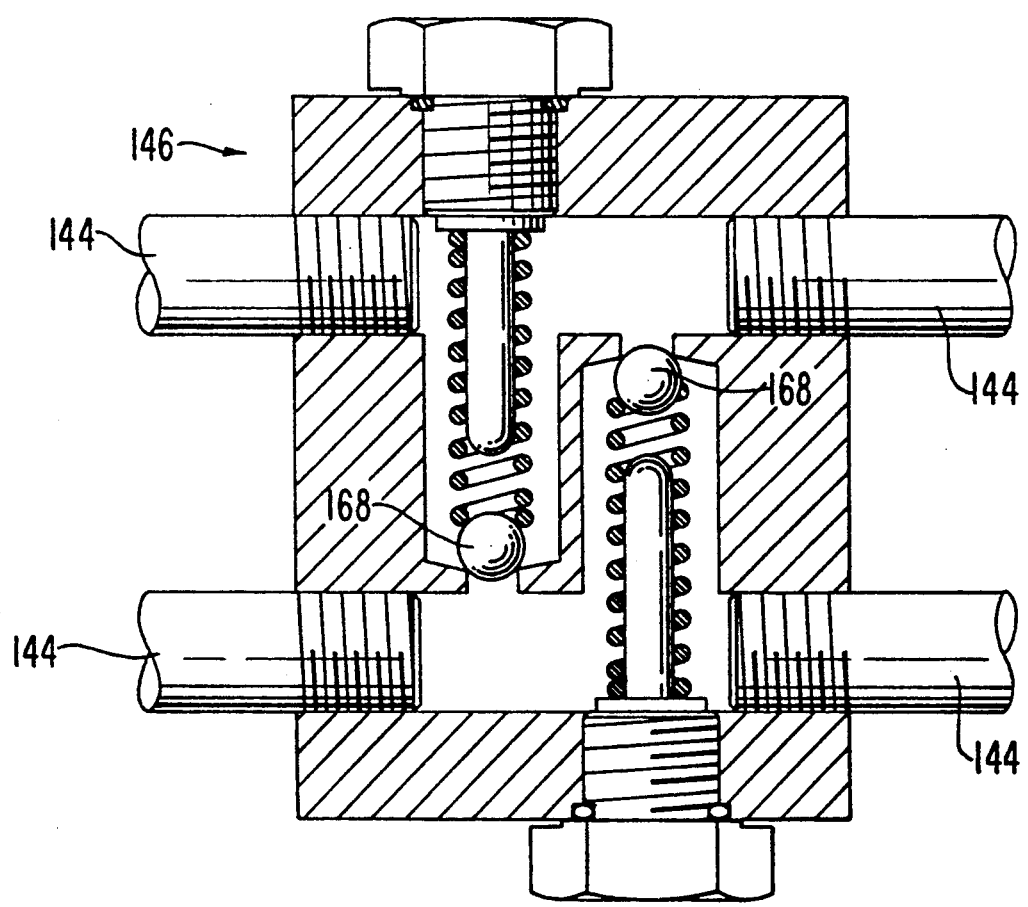
FIG. 20 is a somewhat diagrammatic longitudinal sectional view of a pressure relief manifold employed in the third embodiment.

A preferred centrifugal brake 150 for yaw rate limitation is shown in FIGS. 18 and 19, and a preferred pressure relief manifold 146 is shown in FIG. 20. As is apparent in FIGS. 18 and 19, four brake shoes 152 are movable radially outward on guide pins 154 extending from a rotating hub 156 fixed to an end of the shaft 158 of the electric motor 148. Up to about 1800 RPM, the restraining force of a garter spring 160, circumscribing the brake shoes in a groove 162, is sufficient to keep the brake shoes form moving outwardly into engagement with a brake lining 164 fixed to the interior of the housing 166 of the brake. However, when the RPM exceeds 1800 RPM, the brake shoes move to engage the brake lining and limit the RPM to about 1850 RPM.

As shown in FIG. 20, spring-biased check valves 168 are adapted to interconnect the hydraulic lines 144, so as to bypass hydraulic fluid from one of the lines to the other when the relative hydraulic pressure exceeds a set limit.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. Free-yaw, free-pitch, wind-driven electric generator apparatus of the downwind type, comprising a generator head supported on a tower for wind-driven free-yaw movement about a substantially vertical yaw axis and for wind-driven free-pitch movement about a substantially horizontal pitch axis between predetermined upward and downward limits, said generator head including a rotor rotatable about a rotor axis substantially perpendicular to said pitch axis and having elongated blades supported on a hub that is rigidly attached to a rotor shaft driving an electric generator, said blades having a predetermined initial coning angle therebetween and being substantially flexible so that the coning angle varies with wind velocity, and control means responsive to the rate of yaw movement of said generator head for limiting the rate of yaw movement of said generator head to prevent an excessive yaw rate.

2. Apparatus in accordance with claim 1, further comprising fin means for maintaining said rotor shaft azimuthally aligned with the wind direction, said fin means including an elongated substantially vertical fin with side surfaces in planes substantially parallel to said rotor shaft.

3. Apparatus in accordance with claim 2, wherein said fin means includes a pair of such fins extending respectively upwardly and downwardly relative to the rotor shaft.

4. Apparatus in accordance with claim 1, wherein said control means comprises brake means that becomes operative when the rate of yaw movement of said generator head exceeds a predetermined yaw rate.

5. Apparatus in accordance with claim 4, wherein said brake means includes a fly-weight unit responsive to said rate of yaw for producing a braking force dependent upon the rate of yaw.

6. Apparatus in accordance with claim 5, wherein said brake means includes a first portion supported on said generator head for yaw movement therewith and a second portion fixed to said tower, said first portion including said fly-weight unit and a brake force exerting unit actuated from said fly-weight unit hydraulically.

7. Apparatus in accordance with claim 6, wherein said second portion includes a first gear, and said first portion includes a second gear meshed with the first gear and driven in response to yaw movement of said generator head, said second gear being coupled to said fly-weight unit for driving the same.

8. Apparatus in accordance with claim 7, wherein said first gear is a disk gear and said brake force exerting unit includes caliper means for variably clamping said disk gear.

9. Apparatus in accordance with claim 4, wherein said brake means is a hydraulic brake system including fluid reservoir means, hydraulically-actuated brake force exerting means, and pump means for pumping hydraulic fluid from said reservoir means to said brake force exerting means.

10. Apparatus in accordance with claim 9, wherein said pump means comprises a pump driven mechanically in response to yaw movement of said generator head.

11. Apparatus in accordance with claim 10, wherein said pump is a reciprocating-piston pump.

12. Apparatus in accordance with claim 9, wherein said hydraulic brake system includes by-pass means for returning fluid from said pump means to said reservoir means, said by-pass means having control valve means for controlling the rate at which hydraulic fluid is returned to said reservoir means in accordance with the yaw rate of said generator head.

13. Apparatus in accordance with claim 12, wherein said control valve means includes a control valve actuated by a fly-weight unit driven in response to yaw movement of said generator head.

14. Free-yaw wind-driven electric generator apparatus of the downwind type, comprising a generator head supported on a tower for wind-driven free-yaw movement about a substantially vertical yaw axis, said generator head including a rotor rotatable about a rotor axis transverse to said yaw axis, and control means responsive to the rate of yaw movement of said generator head for limiting the rate of yaw movement of said generator head to prevent an excessive yaw rate.

15. Apparatus in accordance with claim 14, wherein said control means comprises brake means that becomes operative when the rate of yaw movement of said generator head exceeds a predetermined yaw rate.

16. Apparatus in accordance with claim 15, wherein said brake means includes a fly-weight unit responsive to said rate of yaw for producing a braking force dependent upon the rate of yaw.

17. Apparatus in accordance with claim 16, wherein said brake means includes a first portion supported on said generator head for yaw movement therewith and a second portion fixed to said tower, said first portion including said fly-weight unit and a brake force exerting unit actuated from said fly-weight unit hydraulically.

18. Apparatus in accordance with claim 17, wherein said second portion includes a first gear, and said first portion includes a second gear meshed with the first gear and driven in response to yaw movement of said generator head, said second gear being coupled to said fly-weight unit for driving the same.

19. Apparatus in accordance with claim 18, wherein said first gear is a disk gear and said brake force exerting unit includes caliper means for variably clamping said disk gear.

20. Apparatus in accordance with claim 15, wherein said brake means is a hydraulic brake system including fluid reservoir means, hydraulically-actuated brake force exerting means, and pump means for pumping hydraulic fluid from said reservoir means to said brake force exerting means.

21. Apparatus in accordance with claim 20, wherein said pump means comprises a pump driven mechanically in response to yaw movement of said generator head.

22. Apparatus in accordance with claim 21, wherein said pump is a reciprocating-piston pump.

23. Apparatus in accordance with claim 20, wherein said hydraulic rake system includes by-pass means for returning fluid from said pump means to said reservoir means, said by-pass means having control valve means for controlling the rate at which hydraulic fluid is returned to said reservoir means in accordance with the yaw rate of said generator head.

24. Apparatus in accordance with claim 23, wherein said control valve means includes a control valve actuated by a fly-weight unit driven in response to yaw movement of said generator head.

25. Wind-driven apparatus of the downwind type, comprising a head supported for wind-driven yaw movement about a substantially vertical yaw axis without restriction as to the extent of yaw movement and for wind-driven pitch movement about a substantially horizontal pitch axis between predetermined upward and downward limits, said head including a wind-driven rotor rotatable about a rotor axis substantially perpendicular to said pitch axis, first frontal means for damping the yaw movement of said head, and second control means for damping the pitch movement of said head, wherein said second control means comprises a hydraulic cylinder with a piston movable therein in response to pitch movement of the head.

26. Apparatus in accordance with claim 25, wherein the first control means comprises a hydraulic pump unit that drives a hydraulic motor unit in response to wind-driven yaw movement of said head.

27. Apparatus in accordance with claim 26, wherein said first control means further comprises brake means responsive to the rate of yaw movement of said head for limiting the rate of yaw movement of said head to prevent an excessive yaw rate.

28. Apparatus in accordance with claim 26, further comprising an electric motor for driving said hydraulic motor unit as a hydraulic pump for supplying hydraulic fluid to drive said hydraulic pump unit as a hydraulic motor, for changing the azimuthal orientation of said head, and means for energizing said electric motor when the azimuth orientation of said head relative to the wind direction is beyond a predetermined azimuth range.

29. Apparatus in accordance with claim 25, wherein said first control means provides a predetermined azimuth range of substantially unrestrained yaw movement of said head.

30. Apparatus in accordance with claim 25, wherein said piston is supported on a piston rod with means at opposite ends thereof for providing said upward and downward limits.

31. Apparatus in accordance with claim 25, wherein said cylinder is pivotally movable about a substantially horizontal axis and has one end of said piston rod pivotally connected to said head so as to partake of the pitch movement of said head.

32. Apparatus in accordance with claim 31, wherein said piston has a passage therethrough and said cylinder contains hydraulic fluid at opposite sides of said piston movable through said passage when said piston moves in said cylinder.

33. Apparatus in accordance with claim 32, wherein said cylinder also obtains air pockets trapped at opposite side of said piston in order to provide a predetermined pitch angle range of unrestrained pitch movement of said head.

34. Apparatus in accordance with claim 26, wherein said first control means further comprises a centrifugal brake that limits the RPM of said hydraulic motor unit, said brake including brake shoe means rotatable with a hub and movable radially outward from the hub, spring means for preventing substantial radially outward movement of said shoe means until the hub rotates at a predetermined RPM, and brake lining means engageable with said shoe means after the predetermined RPM is exceeded.

35. Wind-driven apparatus of the downwind type, comprising a head including a wind-driven rotor, said head being supported for wind-driven pitch movement about a substantially horizontal pitch axis between predetermined upward and downward limits, said rotor being rotatable about a rotor axis substantially perpendicular to said pitch axis, and control means for controlling the rate of pitch movement of said head and for damping the pitch movement of said head, wherein said control means comprises a hydraulic cylinder with a piston movable therein in response to pitch movement of the head.

36. Apparatus in accordance with claim 35, wherein said piston is supported on a piston rod with means at opposite ends thereof for providing said upward and downward limits.

37. Apparatus in accordance with claim 36, wherein the means for providing said upward and downward limits comprises bumpers mounted on said piston rod and engageable with respective ends of said cylinder.

38. Apparatus in accordance with claim 35, wherein said cylinder is pivotally movable about a substantially horizontal axis and has one end of said piston rod pivotally connected to said head so as to partake of the pitch movement of said head.

39. Apparatus in accordance with claim 38, wherein said piston has a passage therethrough and said cylinder contains hydraulic fluid at opposite sides of said piston movable through said passage when said piston moves in said cylinder.

40. Apparatus in accordance with claim 39, wherein said cylinder also contains air pockets trapped at opposite ends of said piston in order to provide a predetermined pitch angle range of unrestrained pitch movement of said head.

41. Wind-driven apparatus of the downwind type, comprising a head including a wind-driven rotor, said head being supported for wind-driven pitch movement about a substantially horizontal pitch axis between predetermined upward and downward limits, said rotor being rotatable about a rotor axis substantially perpendicular to said pitch axis, and control means for controlling the rate of pitch movement of said head, said control means providing a predetermined pitch angle range of substantially unrestrained pitch movement of said head and providing damped pitch movement of said head when the pitch movement exceeds said predetermined pitch angle range, wherein said control means comprises a hydraulic cylinder with a piston movable therein in response to pitch movement of the head.

42. Wind-driven apparatus of the downwind type, comprising a head including a wind-driven rotor, said head being supported for wind-driven yaw movement about a substantially vertical yaw axis without restriction as to the extend of yaw movement, said rotor being rotatable about a rotor axis transverse to said yaw axis, and control means for damping the yaw movement of said head, said control means providing a predetermined yaw angle range of substantially unrestrained yaw movement of said head and providing damped yaw movement of said head when the yaw movement exceeds said predetermined yaw angle range wherein said control means further comprises brake means responsive to the rate of yaw movement of said head for limiting the rate of yaw movement of said head to prevent an excessive yaw rate.

43. Wind-driven apparatus of the downwind type, comprising a head including a wind-driven rotor, said head being supported for wind-driven yaw movement about a substantially vertical yaw axis without restriction as to the extend of yaw movement, said rotor being rotatable about a rotor axis transverse to said yaw axis, and control means for damping the yaw movement of said head, said control means comprising a hydraulic pump unit that drives a hydraulic motor unit in response to wind-driven yaw movement of said head, said control means further comprising brake means responsive to the rate of yaw movement of said head for limiting the rate of yaw movement of said head to prevent an excessive yaw rate.

44. Apparatus in accordance with claim 43, further comprising an electric motor for driving said hydraulic motor unit as a hydraulic pump for supplying hydraulic fluid to drive said hydraulic pump unit as a hydraulic motor, for changing the azimuthal orientation of said head, and means for energizing said electric motor when the azimuth orientation of said head relative to the wind direction is beyond a predetermined azimuth angle range.

* * * * *